(12) United States Patent  (10) Patent No.: US 8,112,004 B2
Ishibashi  (45) Date of Patent: Feb. 7, 2012

(54) OPTICAL RECEIVER IMPLEMENTED WITH DUAL ELECTRONIC DISPERSION COMPENSATORS

(75) Inventor: Hiroto Ishibashi, Yokohama (JP)

(73) Assignee: Sumitomo Electric Industries, Ltd., Osaka-shi (JP)

( * ) Notice: Subject to any disclaimer, the term of this patent is extended or adjusted under 35 U.S.C. 154(b) by 640 days.

(21) Appl. No.: 12/261,676

(22) Filed: Oct. 30, 2008

(65) Prior Publication Data

US 2009/0116852 A1    May 7, 2009

(30) Foreign Application Priority Data

Nov. 1, 2007   (JP) ................. 2007-285503

(51) Int. Cl.
 *H04B 10/06* (2006.01)
(52) U.S. Cl. ................. 398/208; 398/202; 398/209
(58) Field of Classification Search .......... None
See application file for complete search history.

(56) References Cited

U.S. PATENT DOCUMENTS

| | | | |
|---|---|---|---|
| 6,204,949 B1 * | 3/2001 | Ishikawa et al. | 398/159 |
| 6,694,273 B2 * | 2/2004 | Kurooka et al. | 702/69 |
| 6,823,142 B1 * | 11/2004 | Tanaka et al. | 398/152 |
| 7,113,709 B2 * | 9/2006 | Kawasumi | 398/208 |
| 7,386,240 B2 * | 6/2008 | Thomson et al. | 398/193 |
| 7,570,889 B2 * | 8/2009 | Shastri et al. | 398/209 |
| 7,936,999 B1 * | 5/2011 | Hawryluck et al. | 398/206 |
| 2003/0099432 A1 * | 5/2003 | Furuki et al. | 385/24 |
| 2007/0071447 A1 * | 3/2007 | Ozaki et al. | 398/147 |
| 2008/0069199 A1 * | 3/2008 | Chen et al. | 375/233 |
| 2009/0116844 A1 * | 5/2009 | Tanaka et al. | 398/115 |

FOREIGN PATENT DOCUMENTS

| | | |
|---|---|---|
| JP | 08-163027 | 6/1996 |
| JP | 2000-151516 | 5/2000 |
| JP | 2001-060976 | 3/2001 |
| JP | 2006-174073 | * 12/2004 |
| JP | 2006-174073 | 6/2006 |

* cited by examiner

*Primary Examiner* — Shi K Li
*Assistant Examiner* — Rajsheed Black-Childress
(74) *Attorney, Agent, or Firm* — Venable LLP; Michael A. Sartori; Leigh D. Thelen

(57) ABSTRACT

An optical receiver implemented with two electronic dispersion compensators (EDC) is disclosed. The optical receiver selects one of the EDC in an ordinary operation. Once there shaped signal compensated by the selected EDC is degraded due to irregular conditions of the optical transmission line, the optical transmitter and so on, the optical receiver reconfigures the tap coefficients of the unselected EDC and switches to the newly configured EDC after setting the tap coefficients for the new condition of the transmission line and the transmitter.

7 Claims, 3 Drawing Sheets

OPTICAL RECEIVER IMPLEMENTED WITH DUAL ELECTRONIC DISPERSION COMPENSATORS

BACKGROUND OF THE INVENTION

1. Field of the Invention

The present invention relates to an optical receiver and a method to control the optical receiver.

2. Related Prior Arts

An electrically compensating method for the dispersion attributed to a multimode fiber has been developed. The method is called as the electrical dispersion compensator (hereafter denoted as EDC). A Japanese patent application published as JP-H08-163027A has disclosed one of circuits applicable to the EDC. The circuit disclosed therein is a type of optical signal processor and includes a plurality of delay units that sequentially delays a signal converted from the received optical signal and outputs thus delayed signals in parallel, a plurality of multipliers each coupled with one of delay units and multiplying the delayed signal by a coefficient unique to the delay unit, an adder that sums up respective outputs of the multiplier, and an arithmetic unit to evaluate the coefficients, which is one type of, what is called, transversal filter.

Optimum multiplied coefficients set in the multipliers strongly depend on the optical transmission line. The aged deterioration, the tensile stress or the bent status of the fiber, and so on, affects the optimum multiplied coefficients. Thus, the EDC is necessary to evaluate the optimum coefficients by the arithmetic unit. However, depending on the conditions of the transmission line, the arithmetic unit is occasionally unable to evaluate the optimum multiplied coefficients, which results in a drastic increase of the bit error rate.

Even in such a case that the arithmetic unit could not reach the optimum coefficients, the transversal filter sometimes gives the optimum set of multiplied coefficients by resetting whole coefficients. However, the resetting the filter means that, the optical receiver implementing this filter is unavoidable to be temporarily ceased. Thus, an aspect of the present invention is to provide an optical receiver with a function to adjust or to reset the multiplied coefficients of the transversal filter without suspending the optical receiver.

SUMMARY OF THE INVENTION

One aspect of the present application relates to a configuration of an optical receiver implementing at least two EDCs. The optical receiver further includes a front end receiver, a selector and a controller. The front end receiver converts an input optical signal into a corresponding electrical signal and transmits this electrical signal to the EDCs. The selector selects one of outputs of the EDCs. The controller decides which outputs of the EDCs should be selected by the selector. The at least two EDCs may provide the same configuration to each other.

According to the optical receiver of the present application, when a difference between an analog signal reshaped from the converted electronic signal and a digital signal discriminated from the reshaped analog signal exceeds a preset level, the controller may command the selector to select another EDC after the other EDC reconfigures a set of tap coefficients.

The optical receiver of the present application may further provide a clock data recovery (CDR) that receives an output of the selector, that is, the output of the currently selected EDC. In the present invention, the selector may select the other EDC in synchronous with the clock data contained in the output of the currently selected EDC.

Another aspect of the present application relates to a method to control an optical receiver implementing at least two EDCs. The method includes steps of: (1) watching a difference between an analog output of the currently selected EDC, which is reshaped from an output of a front end receiver, and a digital output discriminated from the analog output of the EDC, and (2) selecting another EDC, when the watched difference of the currently selected EDC exceeds a preset level, after the other EDC reconfigures a set of tap coefficients of the transversal filter.

The method may further include a step to revise the preset level to a difference between the analog data and the digital data of the other EDC when the other EDC reconfigures the set of tap coefficients, or to a new level greater by a preset increment than the difference of the other EDC whose set of the tap coefficient is configured.

DESCRIPTION OF PREFERRED EMBODIMENTS

Next, preferred embodiments of the present invention will be described as referring to accompanying drawings. In the description of the drawings, the same numerals or the same symbols will refer to the same elements without overlapping explanations as possible.

Figure 1:
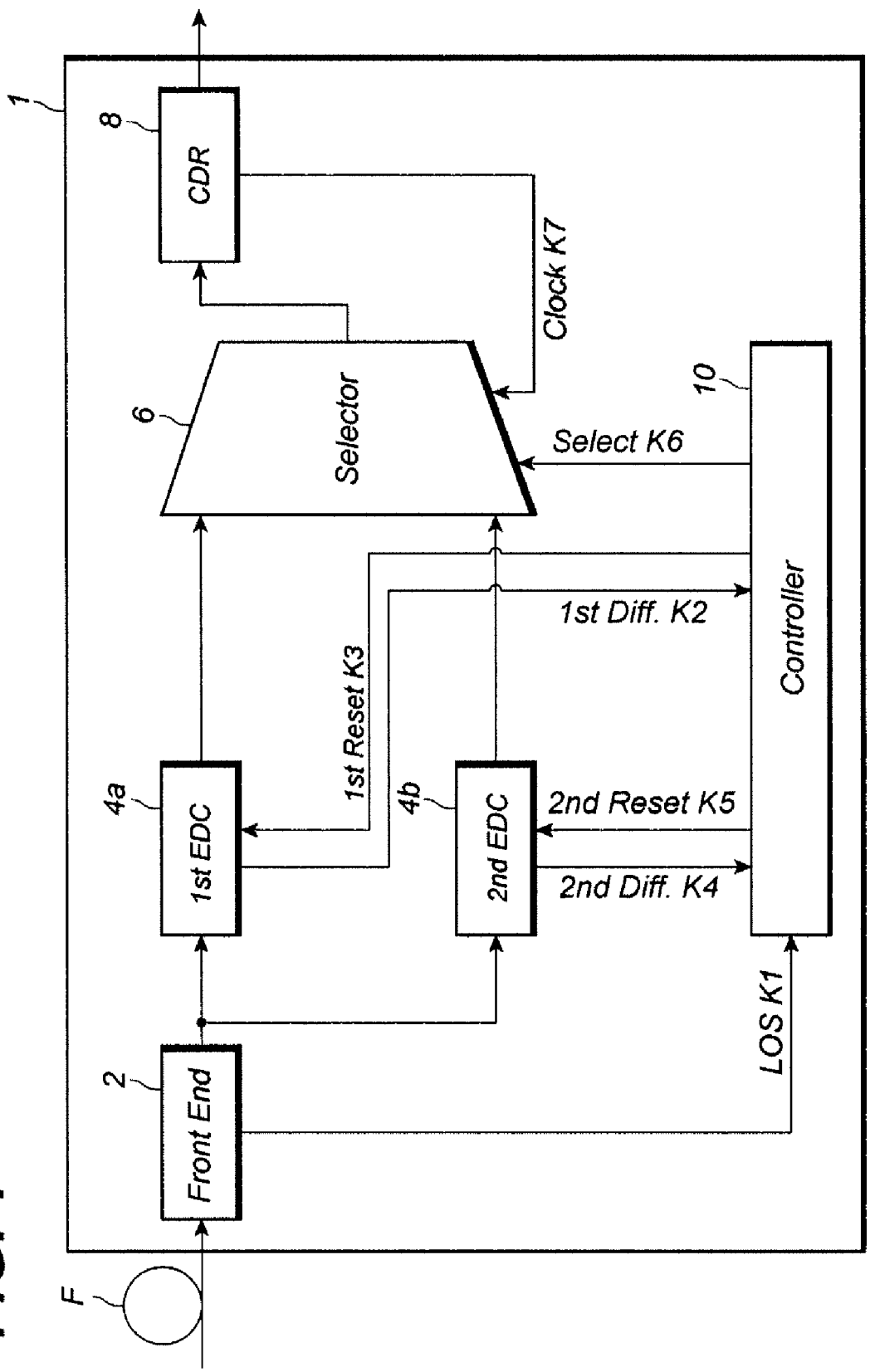
FIG. 1 is a block diagram of an optical receiver according to an embodiment of the present invention.

FIG. 1 is a block diagram of an optical receiver according to an embodiment of the invention. The optical receiver 1 comprises a front end receiver 2, a first EDC 4a, a second EDC 4b, a selector 6, a clock data recovery (hereafter denoted as CDR) 8, and a controller 10. The front end receiver 2 receives an optical signal transmitted in an optical fiber F and converts this optical signal into an electrical signal. This electrical signal is commonly provided with the first and second EDCs, 4a and 4b. The front end receiver 2 also provides a status signal K1 to the controller 10. The status signal K1 decides whether the front end receiver 2 receives no or substantially no optical signal, and this status is often called as "Loss Of Signal (LOS)" state.

The first and second EDCs, 4a and 4b, are disposed between the front end receiver 2 and the selector 6, that is, each input of the EDC, 4a or 4b, receives the output of the front end receiver 2, while, the output thereof is coupled with the input of the selector 6. Each EDC, 4a or 4b, provides a transversal filter able to reduce the influence of the dispersion due to the optical F by adjusting the multiplied coefficients of the filter. This dispersion is reflected in the optical signal received by the front end receiver 2.

The first EDC 4a reshapes the electrical signal coming from the front end receiver 2, and outputs this reshaped signal to the selector 6. Thus, the EDC 4a is a type of the electronic dispersion correction circuit. The first EDC 4a also outputs a first differential signal K2 to the controller 10. This differential signal K2 corresponds to a difference between the reshaped signal in an analog form and a digital signal converted from this reshaped signal. The differential signal K2 is used to adjust the multiplied coefficients. The arithmetic unit included in the transversal filter may reduce the difference between the analog signal and the digital signal above described.

Figure 2:
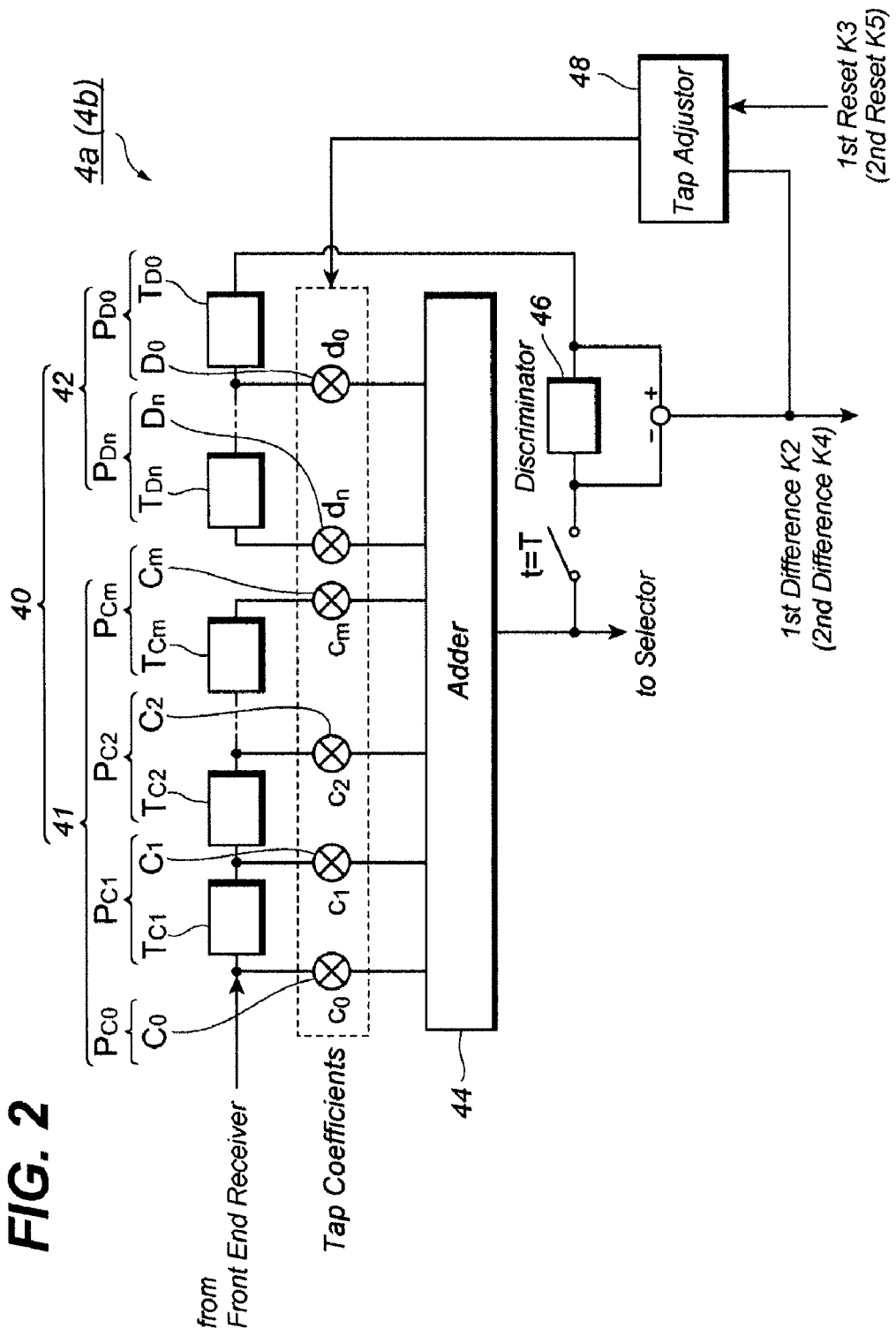
FIG. 2 is a block diagram of an electronic dispersion compensator implemented within the optical receiver of the present invention.

The multiplied coefficient is often called as the tap coefficient of the transversal filter and, as illustrated in FIG. 2, includes a plurality of forward coefficients, $c_0$ to $c_m$, and a plurality of feedback coefficients, $d_0$ to $d_m$. The differential signal K2 is a difference of the output of the EDC 4a. When the EDC receives the first reset K3 from the controller 10, the EDC resets all tap coefficients, namely, the EDC sets all coefficients to be zero. Negating the reset K3, the EDC begins to adjust the tap coefficients.

The second EDC 4b has the same configuration with that of the first EDC 4a. The second EDC 4b generates the second difference K4 to the controller 10. This second difference K4 is also used to adjust the tap coefficients in the second EDC 4b. When the second EDC 4b receives the reset K5 from the controller 10, the second EDC 4b sets all tap coefficients to be zero, and begins the adjustment of the tap coefficients in synchronizing with the release of the reset K5.

The selector 6 selects one of the outputs from the first EDC 4a and from the second EDC 4b by the command K6 provided from the controller 10; and sends this selected output to the CDR 8. The selector 6 also receives the clock K7 recovered in the CDR 8. Thus, the selector 6 may select one of the outputs in synchronizing with the clock K7.

The CDR 8, when it receives one of the outputs of the EDCs, 4a or 4b, selected by the selector 6, and recovers the clock contained in the output above mentioned.

The controller 10 provides a central processing unit, which is often called as CPU, a ROM, a RAM, and so on. The CPU controls two EDCs, 4a and 4b, and the selector 6 by executing programs stored in the ROM or the RAM according to the flow chart shown in FIG. 3. The controller decides which outputs of the first EDC 4a or that of the second EDC 4b should be coupled with the CDR 8, and sends the command K6 based on this decision to the selector K6.

For instance, in a case where the first EDC 4a couples with the CDR 6, at the same time the second EDC 4b is in the reset mode, and the first difference K2 of the first EDC 4a becomes greater than a preset level K8, the controller releases the second reset K5 to the second EDC 4b, which starts the adjustment of the tap coefficients in the second EDC 4b such that the second difference K4 becomes less than the preset level K8. After the second difference K4 converges in a level less than the preset level K8, the controller sends a command K6 to the selector 6 so as to select the output of the second EDC 4b to couple with the CDR 8. The preset level K8 may be held in the ROM or the RAM.

FIG. 2 is a block diagram of the EDC, 4a or 4b, according to the present invention. In the present invention, the first and second EDCs, 4a and 4b, have the same configuration to each other. The EDC 4a includes the transversal filter 40 and an adjustor 48. The transversal filter 40 is configured with a feed forward equalizer (hereafter denoted as FFE) 41, a decision feedback equalizer (hereafter denoted as DFE) 42, an adder section 44, and a discriminator 46. The transversal filter 40 receives an electrical output of the front end receiver 2, reshapes this output and sends the reshaped output to the selector 6.

The FFE 41 includes a plurality of delay units, $T_{C1}$ to $T_{Cm}$, where m is an integer greater than unity, and a plurality of multipliers, $C_0$ to $C_m$. These delay units and the multipliers constitute taps, $P_{C0}$ to $P_{Cm}$, of the FFE 41. The DFE 42 includes a plurality of delay units, $T_{D0}$ to $T_{Dn}$, where n is an integer greater than unity, and a plurality of multipliers, $D_0$ to $D_n$. These delay units and the multipliers constitute taps, $P_{D0}$ to $P_{Dn}$, of the DFE.

The first tap $P_{C0}$ includes only the first multiplier $C_0$, while, other taps, $P_{C1}$ to $P_{Cm}$, and taps, $P_{D0}$ to $P_{Dn}$, in the DFE include both the delay unit and the multiplier. The delay unit $T_{Ck}$ delays an signal coming from the upstream delay unit $T_{C(k-1)}$ by one bit and outputs this delayed signal to both the downstream delay unit $T_{C(k+1)}$ and the multiplier $C_k$. While, the delay unit $T_{Dj}$ in the DFE delays a signal coming from the upstream delay unit $T_{D(j-1)}$ by one bit and outputs this delayed signal to both the downstream delay unit $T_{D(j+1)}$ and the corresponding multiplier $D_j$.

The first multiplier, $C_0$, multiplies the signal from the front end receiver 2 by the tap coefficient $c_0$ and outputs the product to the adder 44. The subsequent multiplier, $C_k$, multiplies the signal output from the delay unit $T_{ck}$ by the tap coefficient $c_k$, and sends the product to the adder 44.

The adder 44 sums up the products each sent from the multipliers, $C_0$ to $C_m$, and also sums up the products sent from the other set of multipliers, $D_0$ to $D_n$, in the DFE 42. The adder 44 outputs thus summed up products to the selector 6.

The discriminator 46 decides the level of the output of the adder 44, that is, the discriminator 46 judges whether the output of the adder 44 is in the level "1" or in the level "0" digitally, and sends the discriminated result to the first delay unit $T_{D0}$ in the DFE 42. The difference between the input of the discriminator 46 and the output thereof corresponds to the difference signal K2, which is K4 for the second EDC 4b. Thus, the difference signal, K2 or K4, is a difference between the reshaped analog signal and its digitally converted signal. Accordingly, the difference signal, K2 or K4, becomes an index how close the reshaped analog signal to the digital signal to be recovered. This difference signal, K2 or K4, is sent to the adjustor 48 and also to the controller 10.

The adjustor 48 adjusts the tap coefficients, $c_0$ to $c_m$ in the FFE 41 and $d_0$ to $d_n$ in the DFE 42 such that the difference signal K2 becomes less than a preset level. When an adequate level of difference signal K2 is obtained, the adjustor 48 fixes the whole tap coefficients. The multipliers, $C_0$ to $C_m$ in the FFE 41 and $D_0$ to $D_n$ in the DFE, multiply respective delayed signals by thus fixed tap coefficients, $c_0$ to $c_m$ and $d_0$ to $d_n$. Accordingly, the transversal filter 40 may reshape the output of the front end receiver 2 adequately and electrically reduce the influence of the dispersion of the fiber.

The adjustor 48 may reset the whole tap coefficients, $c_0$ to $c_m$ and $d_0$ to $d_n$, namely, set to zero, in synchronous with the assertion of the reset command K3 from the controller 10. Negating the command K3, which means that the reset is released, the adjustor 48 begins to adjust the tap coefficients.

Figure 3:
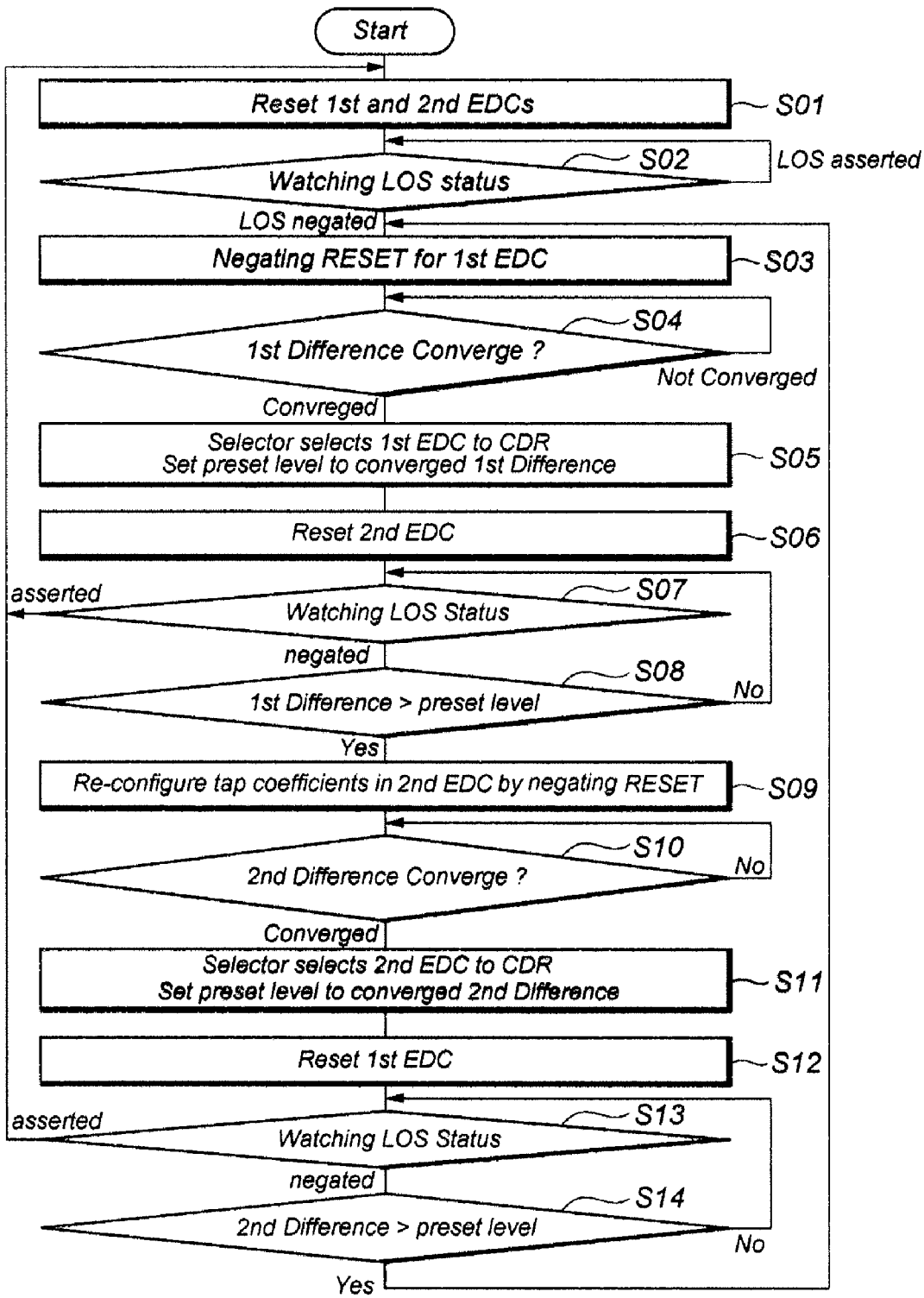
FIG. 3 is a flow chart to switch between two electronic dispersion compensators.

Next, an operation of the optical receiver will be described as referring to FIG. 3. An exemplary case is assumed, where the front end receiver 2 outputs no substantial signal to two EDCs, 4a and 4b, due to some failures of the optical transmitter or the optical transmission line. In this case, the front end receiver 2 outputs a status signal K1 (Loss-Of-Signal: LOS) to the controller 10, and the controller 10 resets two adjustors 48 in respective EDCs, 4a and 4b, by asserting the commands K3 and K5, at step S01. The controller subsequently watches whether the status signal LOS (K1) is reset or not, that is, whether the front end receiver 2 outputs a substantial signal to both EDCs, 4a and 4b, at step S02. Once resetting the status signal LOS (K1), the procedure advances step S03.

The controller 10 negates one of resets, K3 or K5, in step S03. It is assumed for the explanation sake that the first reset K3 to the first EDC 4a is negated. The tap adjustor 48 in the first EDC 4*a*, responding to the negation of the reset K3, begins to adjust the tap coefficients, $c_0$ to $c_m$ and $d_0$ to $d_n$, based on the first difference K2. Subsequently, the controller 10 watches whether the first difference K2 becomes less than the preset level K8 at step S04.

When the first difference K2 becomes less than the preset level K8, in which the tap adjustor 48 in the first EDC 4*a* fixes the whole tap coefficients, $c_0$ to $c_m$ and $d_0$ to $d_n$, the controller 10 changes the preset level K8, which is the subject of the comparison between the analog and the digital signals, to the first difference K2 or a difference greater than the first difference by a preset increment, and stores thus revised preset level in the RAM. Concurrently with the saving of the new preset level, the controller 10 sends the command K6 (Select) to the selector 6 such that the selector 6 selects the output from the first EDC 4*a*, at step S05. During the steps S03 to S05, the controller continues to assert the second reset K5 to the second EDC 4*b*.

The controller also continues to watch the status signal LOS (K1) at step S07. Once deciding the status signal LOS (K1) is asserted, the optical receiver 1 iterates the operation from step S01. During the status signal LOS (K1) is negated, the controller 10 continuously watches the first difference K2 and decides whether the first difference K2 exceeds the preset level K8 or not, which was set at step S05, at step S08. During the first difference K2 is less than the preset level K8, the controller 10 iterates the watching of the status signal LOS (K1) and the first difference K2.

When the first difference K2 exceeds the present level K8, the controller 10 releases the second reset K5 for the second EDC 4*b* at step S09. The tap adjustor 48 in the second EDC 4*b*, responding to the negation of the second reset K5, begins to adjust the tap coefficients by using the second difference K4. The controller 10 watches whether the second difference K4 becomes less than the preset level K8, at step S10.

After the convergence of the second difference K4, the tap adjustor 48 in the second EDC 4*b* fixes the whole tap coefficients thereof, $c_0$ to $c_m$ and $d_0$ to $d_n$, while, the controller 10 changes the preset level K8 to the current second difference K4, or a value greater than the second difference K4 by the preset increment and saves this revised preset level K8 in the RAM. Concurrently with the saving of the revised preset level K8, the controller 10 commands the selector 6 so as to select the output of the second EDC 4*b* by sending the signal K6 at step 11 and resets the first EDC 4*a* by sending the first reset K3 at step 12.

After switching the input of the CDR 8, the controller 10 continues to watch the signal status LOS (K1) and the second difference K4 at step 13. When the status LOS (K1) is asserted, the procedure jumps to step S01. When the status LOS (K1) is negated but the second difference K4 exceeds the preset level K8, the procedure jumps to step S03.

Thus, the optical receiver according to the described embodiment implements two EDCs, 4*a* and 4*b*. When the first EDC 4*a* is selected so as to be coupled with the CDR 8 and the first difference K2 thereof exceeds the preset level K8, the optical receiver 1 may adjust the tap coefficients in the second EDC 4*b* as keeping the output of the first EDC 4*a* to be coupled with the CDR 8. After the adjustment of the tap coefficients in the second EDC 4*b* is completed, the optical receiver 1 may switch the output of the second EDC 4*b* to be coupled with the CDR 8. Accordingly, the optical receiver 1 may readjust the tap coefficients of the EDC without interrupting the normal operation of the optical receiver. Moreover, the selector 6 receives the clock from the CDR 8, the switching between two outputs of the two EDCs may be synchronized with the clock, which may release the optical receiver 1 from interposing a dead time for the switching.

While the preferred embodiments of the present invention have been described in detail above, many changes to these embodiments may be made without departing from the true scope and teachings of the present invention. For instance, the embodiments above described concentrates on a case where two EDCs, 4*a* and 4*b*, provide the same configuration to each other. However, the EDCs may have different arrangements. Moreover, the optical receiver may implement three or more EDCs to show the function described above. The present invention, therefore, is limited only as claimed below and the equivalents thereof.

What is claimed is:

1. An optical receiver, comprising:
    a front end receiver that converts an input optical signal into a corresponding electrical signal;
    at least two electronic dispersion compensators having a same configuration to each other and including a transversal filter with a plurality of taps to reshape said electrical signal by adjusting a tap coefficient specified to respective taps, said electronic dispersion compensators each providing an output;
    a selector that select one of said outputs of said electronic dispersion compensator; and
    a controller configured to decide which outputs of said electronic dispersion compensators is selected by said selector,
    wherein each of said electronic dispersion compensator outputs a difference between an analog signal reshaped from said electrical signal and a digital signal discriminated from said analog signal, and
    wherein said controller selects another electronic dispersion compensator after said other electronic dispersion compensator reconfigures a set of said tap coefficients thereof when said difference of currently selected electronic dispersion compensator exceeds a preset level.

2. The optical receiver according to claim 1,
    further comprising a clock data recovery that receives one of outputs of said electronic dispersion compensators selected by said selector and recovers a clock data contained in said one of outputs,
    wherein said selector select said outputs of said electronic dispersion compensators in synchronous with said clock data providing from said clock data recovery.

3. A method to control an optical receiver that is implemented with at least two electronic dispersion compensators and a front end receiver, said method comprising steps of:
    watching a difference between an analog output reshaped from an output of said front end receiver and a digital output discriminated from said analog output in currently selected electronic dispersion compensator among said at least two electronic dispersion compensators; and
    selecting another electronic dispersion compensator, when said difference of said currently selected electronic dispersion compensator exceeds a preset level, after said other electronic dispersion compensator reconfigures a set of tap coefficients of a transversal filter contained in said other electronic dispersion compensator.

4. The method according to claim 3,
    wherein said at least two electronic dispersion compensators provide a same configuration to each other.

5. The method according to claim 3,
    further comprising a step, after said selecting said other electronic dispersion compensator, revising said preset level to a difference of said other electronic dispersion compensator when said other electronic dispersion compensator is reconfigured in said set of said tap coefficients.

6. The method according to claim 3, further comprising a step, after said selecting said other electronic dispersion compensator, revising said preset level to a value greater than a difference of said other electronic dispersion compensator when said other electronic dispersion compensator is reconfigured in said set of said tap coefficients by a preset increment.

7. The method according to claim 3, wherein said selection of said other electronic dispersion compensator is carried out in synchronous with a clock data contained in an output of currently selected electronic dispersion compensator.

* * * * *